United States Patent Office 3,431,320
Patented Mar. 4, 1969

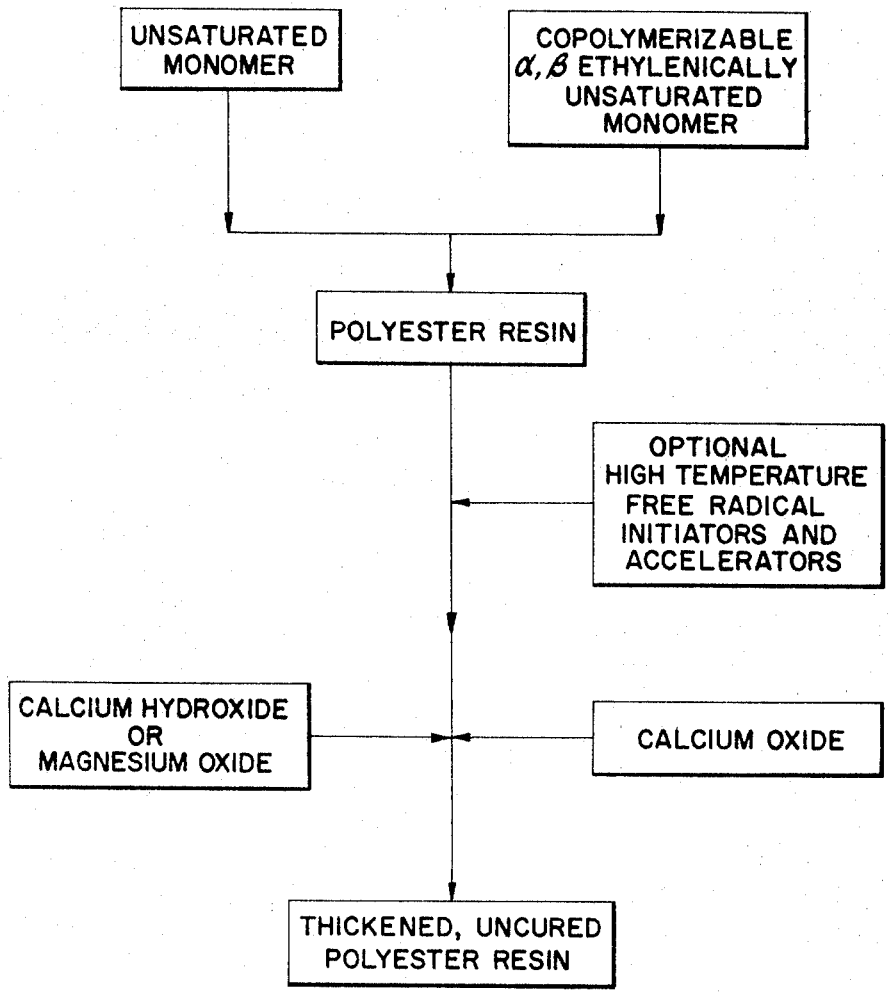

3,431,320
POLYESTER RESIN COMPOSITION HAVING A
THICKENING AGENT THEREIN
Melvin E. Baum and Frank Fekete, Monroeville, and John A. Hatton, Verona, Pa., assignors to Koppers Company, Inc., a corporation of Delaware
Filed Dec. 11, 1967, Ser. No. 689,595
U.S. Cl. 260—865          6 Claims
Int. Cl. C08f 21/00

ABSTRACT OF THE DISCLOSURE

The viscosity of unsaturated polyester resins formed by dissolving the condensation polymers of unsaturated dicarboxylic acids and dihydric alcohols in ethylenically unsaturated copolymerizable monomers may be increased by adding a mixture of calcium oxide and either calcium hydroxide or magnesium oxide to the unsaturated polyester resin. These compounds initially inhibit the viscosity build-up which lengthens the pot life. Unsaturated polyester resins having thickening agents therein are useful in pre-coating of glass fiber mats.

BACKGROUND OF THE INVENTION

Cured unsaturated polyester resins which have been reinforced by fibrous materials such as glass fiber mats or the like have excellent physical strength characteristics. However, the formation of shaped objects with such materials has presented problems because the fibers initially immersed within the uncured liquid resin tend to rise to the surface causing the object, after curing of the resin, to have irregularities in the surface.

To avoid this problem, preforms have been made by spraying glass fibers onto screens similar in shape to the final desired product. Air is sucked through the screen to hold the fibers in place. A binder is then sprayed over the fibers and cured to hold the fibers together in the desired form. The form is then placed into a mold and the unsaturated polyester resin is poured into the mold and cured therein. The resin must be viscous enough to adhere to the form, yet not so viscous as to prevent proper wetting of the fibers.

To overcome the foregoing cumbersome and critical process, it has been proposed to coat the glass fibers with the uncured unsaturated polyester resin liquid to thoroughly wet the fiber. The liquid resin is then thickened, without actually curing the resin by chemical or physical means. The physical means include: (1) driving off a volatile solvent in which a viscous polyester resin has been dissolved, or (2) using a heated viscous polyester resin and then cooling the coated fibers after application. The chemical means include: (1) the addition of a thickening agent such as MgO to the polyester resin, or (2) the partial copolymerization or curing of the resin to a gelled or B-stage. Fibrous reinforcements can thus be pre-coated with a low viscosity thickenable polyester resin which will therefore properly wet the fibers, yet the polyester resin coatings will rapidly lose its tacky state by the increase in viscosity enhancing the storability of the precoated fibers. Thus, the use of preforms is eliminated as well as the attendant mess of coating the irregular-shaped preform with a liquid resin. Glass fiber mats coated with such resins may be easily handled and charged to molding machines. More positive control of the amount of charge as well as the shape of the charge can thus be maintained resulting in higher quality molded products as well as economic savings.

However, such systems each have certain economic drawbacks. The solvent system, of course, results in loss of the solvent plus disposal of the fumes. Heating viscous polyesters to reduce their viscosity is costly and cumbersome. Chemical thickening the polyester resin such as by the addition of MgO or Ca(OH)$_2$ as shown in U.S. Patent 2,568,331 issued to Vincent Frilette results in an eventual viscosity build-up; however, one of its drawbacks is that the initial thickening rapidly builds up the viscosity which reduces the pot life of the resin. Another difficulty encountered is the slow overall build-up of the viscosity of the resin. On the other hand, resins modified to rapidly cure to the B-stage have a tendency to continue to cure or harden beyond the B-stage within a short period of time. The B-stage actually represents an intermediate stage of the vinyl copolymerization or curing of the resin.

SUMMARY OF THE INVENTION

It has now been discovered that chemical thickening of polyester resins by the addition of Ca(OH)$_2$ or MgO can be greatly enhanced by the addition of CaO. This addition results in an inhibition of viscosity build-up for several hours and thereafter causes a rapid high viscosity build-up which can result in viscosities as much as 8 times that obtained using the previously known chemical thickening agents. The invention thus allows the pot life of the resin to be extended yet provides a rapid high viscosity build-up after the initial inhibition of viscosity increase.

In accordance with the invention, an unsaturated polyester resin composition which increases in viscosity after formation of the composition comprises: (a) an unsaturated polyester formed by condensing at least one dicarboxylic acid containing $\alpha,\beta$-ethylenic unsaturation, and a dihydric alcohol; (b) an $\alpha,\beta$-ethylenically unsaturated copolymerizable monomer; and (c) a thickening agent that will increase the viscosity of the composition after a spaced period of time, the thickening agent consisting essentially of a combination of calcium oxide and either calcium hydroxide or magnesium oxide.

This discovery was quite surprising in view of the fact that the addition of CaO by itself does not result in thickening. Apparently the CaO has a synergistic effect upon the Ca(OH)$_2$ or MgO which results in the two effects of initially slowing down the viscosity increase and yet magnifying the eventual viscosity increase.

DETAILED DESCRIPTION

As previously described, in accordance with the invention, an unsaturated polyester resin may be thickened by the addition of a combination calcium oxide and either magnesium oxide or calcium hydroxide to initially inhibit viscosity build-up (thus giving a longer pot life) and then rapidly increasing the viscosity of the resin.

Unsaturated polyester resins are well known in the art (see, for example, U.S. Patent 2,255,313, issued to Carleton Ellis). The unsaturated polyester is a condensation polymer formed by polyesterifying dicarboxylic acids with dihydric alcohols. To form the polyesters approximately equalmolar proportions of the dicarboxylic acids and dihydric alcohols are used. To provide unsaturation within the polyester, at least a portion of the dicarboxylic acids contain ethylenic unsaturation. Examples of such ethylenically unsaturated dicarboxylic acids include maleic and fumaric acids. The remainder of the dicarboxylic acids are usually either saturated normal aliphatics such as adipic acid, succinic acid, or the like, or aromatic diacids such as phthalic acid, isophthalic acid or the like as well as their halogenated derivatives such as tetrachlorophthalic anhydride or the like.

Illustrative of the dihydric alcohols are ethylene glycol, propylene glycol, 1,2-butanediol, 1,3-butanediol, 1,4-butanediol, diethylene glycol, polypropylene glycol, 2,2-dimethyl-1, 3-propandiol, 1,4-cyclohexane dimethanol and adducts or reaction products of alylene oxides with 2,2′-bis(4-hydroxy phenylene) propane (Bis-phenol A).

The dicarboxylic acids and dihydric alcohols are reacted together in approximately equimolar proportions to form a polyester. The average molecular weight of the polymer is most conveniently measured with respect to the acid end groups. A gram of the polyester is titrated with KOH and the number of milligrams of KOH necessary to neutralize the gram of polyester is called the acid number of the polyester. Acid numbers below 100 usually signify polyesters having sufficient molecular weight to possess good physical properties. Therefore, the unsaturated polyesters useful in the invention are those possessing a molecular weight indicated by an acid number below 100.

After formation, the unsaturated polyester is usually dissolved in an $\alpha,\beta$-ethylenically unsaturated monomer such as styrene or vinyl toluene. The amount of monomer used generally is about 10–60% and preferably 20–50% by weight of the total polyester resin. The unsaturated polyester resin (polyester and monomer) is then cured by initiating a free radical polymerization between the ethylenically unsaturated monomer and the unsaturated polyester at the $\alpha,\beta$-ethylenic double bonds in the polyester. This copolymerization may be initiated by UV light or radiation, but is more commonly initiated by addition of a peroxide catalyst followed by heating. The polyester resin copolymerizes to form a cross-linked thermoset resin.

Illustrative of the copolymerizable ethylenically unsaturated monomers are styrene, $\alpha$-methylstyrene, chlorostyrene, vinyl toluene, divinyl benzene, diallylphthalate, methyl methacrylate and the like.

Examples of peroxide catalysts commonly used to initiate the copolymerization include benzoyl peroxide, methylethyl ketone peroxide, cumene hydroperoxide, and the like. Other free radical generating catalysts may also be used as, for example: 2,2′-azobisisobutyronitrile. Preferably the catalyst system selected is one which is inactive at room temperature since the invention contemplates a desired use of a thickenable, yet unpolymerized resin which retains the flexibility of an uncured resin.

In accordance with the invention, the viscosity of the polyester resin is increased before the final curing of the resin by the addition of novel chemical thickeners which retard rapid viscosity build-up for about several hours and thereafter rapidly raise the viscosity of the resin. This enables workmen in the field to coat, for example, glass fiber mats with the polyester resin compositions of the invention over a longer period of time without fear of premature thickening of the composition within the resin pot which might otherwise necessitate discarding resin too thick to efficiently remove from the pot or, at best, might result in improper wetting of the glass fibers. The composition of the invention not only provides a slower initial viscosity build-up, but provides a rapid and high build-up after a period of about 24–48 hours. This allows workmen, for example, to stack previously coated glass fiber mats after several days in contrast to prior art chemically thickened compositions which may remain "sticky" for several days to a week.

As will be demonstrated hereafter in the examples, polyester resins thickened in accordance with the invention exhibit such a high overall viscosity increase that after 8 days the viscosity is many times the viscosity attained during the initial 24 hours. This is in marked contrast to the prior art systems thickened with only MgO or Ca(OH)$_2$ in similar proportions. Such systems do not exhibit the high ratio of viscosity increases. This characteristic is very important bearing in mind that the object of any viscosity thickening system is to provide a resin of initial low viscosity which will attain eventual high viscosity. To attempt to achieve the high viscosity results of the system of this invention by the use of MgO or Ca(OH)$_2$ alone would result in a system having too high an initial viscosity for practical use.

In accordance with the invention, a mixture of calcium oxide and either magnesium oxide or calcium hydroxide is added to the unsaturated polyester resin before application of the resin to a substrate or fiber mat or the like. The salts may be added before, during or after the addition of the peroxide catalysts commonly used in such systems.

The amount of the inorganic salts and the ratios therebetween may vary somewhat depending upon the amount of viscosity build-up desired. It has been found, however, that the calcium oxide must be used in a minimum amount of at least 1% and preferably 2% by weight of the polyester resin. When magnesium oxide is the second salt, it must be used in a minimum amount of at least 1.5% by weight of the polyester resin. When calcium hydroxide is the second salt it is used in a minimum amount of 2.0% by weight of the polyester resin. While larger amounts of either salt may be used, it has been found that total amounts adding up to greater than about 6% are unnecessary to achieve the rapid and high viscosity chemical thickening of the invention.

It should be noted that the chemical thickening referred to herein is not a gelatin or B-stage of the resin. Such gelatin or B-stage is indicative of commencement of the vinyl copolymerization between the unsaturated portion of the condensation polymer and the ethylenically unsaturated monomer. Polyester resin chemically thickened in accordance with the invention can be completely dissolved off a glass fiber mat impregnated with the resin with acetone. Gelled or B-stage polyester resins are not entirely soluble in acetone which is indicative of the presence of vinyl copolymerization.

The invention will be further understood by referring to the attached flow sheet and the following examples.

Example I 100 gram samples of polyester resin were prepared by diluting Koplac 2000 (a commercial polyester made by condensing maleic anhydride and phthalic anhydride with propylene glycol in mole ratios of 1:1:2 to an acid number of about 30) with monomeric styrene to a 70% by weight polyester 30% by weight monomer content. Various amounts of CaO and Ca(OH)$_2$ were added respectively to each sample and the viscosity change noted. The results are tabulated below:

TABLE I

| Sample No. | Percent CaO | Percent Ca(OH)$_2$ | Initial | Viscosity in cps. | | | | |
|---|---|---|---|---|---|---|---|---|
| | | | | 1 hr. | 3 hrs. | 5 hrs. | 24 hrs. | 168 hrs. |
| 1 | 0 | 5.0 | 1,650 | 25,500 | 75,000 | 116,000 | 380,000 | [1] 3.0 |
| 2 | 2.8 | 0 | 1,650 | [2] | [2] | [2] | [2] | [2] |
| 3 | 3.0 | 2.0 | 1,650 | 1,500 | 1,600 | 2,100 | 650,000 | [1] 8.6 |
| 4 | 2.0 | 3.0 | 1,650 | 1,550 | 5,900 | 120,000 | [1] 1.15 | [1] 8.0 |
| 5 | 1.0 | 4.0 | 1,650 | 1,850 | 68,000 | 150,000 | 550,000 | [1] 5.1 |
| 6 | 4.5 | 2.0 | 1,650 | 1,500 | 1,650 | 1,800 | 760,000 | [1] 17.0 |
| 7 | 3.8 | 2.9 | 1,650 | 1,650 | 2,000 | 76,000 | [1] 5.8 | [1] 25.0 |

[1] Million.   [2] No thickening.

The table illustrates the surprising results obtained by the mixture of salts. While CaO provides no sginificant thickening when used by itself, the $Ca(OH)_2$ when used alone quickly thickens the polyester resin. Yet the combination of the two salts lowers the initial thickening but yields much higher viscosity which are noted already at 24 hours. It should also be noted that when only 1% CaO is used the results are markedly less than when at least 2% is used. Thus 2% is the preferred minimum although even the use of 1% does raise the eventual viscosity.

Example II

Following the procedures of Example I polyester resin samples were prepared using Koplac 2000 polyester dissolved in styrene to a 70:30 polyester to monomer weight ratio. MgO and CaO were added respectively and the viscosity changes noted as follows:

TABLE II

| Sample No. | Percent CaO | Percent MgO | Initial | Viscosity in cps. | | | | |
|---|---|---|---|---|---|---|---|---|
| | | | | 1 hr. | 3 hrs. | 5 hrs. | 24 hrs. | 168 hrs. |
| 1 | 0 | 3.6 | 1,650 | 6,500 | 79,000 | 180,000 | [1] 1.94 | [1] 10.2 |
| 2 | 2.8 | 0 | 1,650 | [2] | [2] | [2] | [2] | [2] |
| 3 | 2.5 | 1.8 | 1,650 | 3,320 | 14,700 | 37,000 | [1] 1.1 | [1] 42 |

[1] Million.  [2] No thickening.

Example III

As a comparison other calcium and magnesium combinations were tested to illustrate the novel and unexpected effects noted when the combinations of the invention are utilized in contrast to other combinations. The combinations were tested in polyester resin solutions having the same constituents as in Examples I and II. The results were as follows:

TABLE III

| | CaO | $Ca(OH)_2$ | MgO | $Mg(OH)_2$ | Initial | Viscosity in cps. | |
|---|---|---|---|---|---|---|---|
| | | | | | | 1 week | 2 weeks |
| 1 | 6 | 0 | 0 | 0 | 1,650 | [1] | [1] |
| 2 | 0 | 0 | 0 | 5.2 | 1,650 | | [2] 0.62 |
| 3 | 3.0 | 0 | 0 | 2.6 | 1,650 | | [2] 0.38 |
| 4 | 0 | 6 | 0 | 0 | 1,650 | [2] 14.7 | |
| 5 | 0 | 0 | 3.6 | 0 | 1,650 | [2] 10.2 | |
| 6 | 0 | 3.3 | 1.8 | 0 | 1,650 | [2] 6.5 | |
| 7 | 0 | 0 | 3.6 | 0 | 1,650 | [2] 10.2 | |
| 8 | 0 | 0 | 0 | 5.2 | 1,650 | [2] 0.51 | |
| 9 | 0 | 0 | 1.8 | 2.6 | 1,650 | [2] 5.8 | |

[1] No thickening.  [2] Million.

In no case was the combination of salts better than either salt by itself and in the calcium hydroxide-magnesium oxide tests the combination gave the worst results; either of the salts by themselves yielded better results than the combination. This is in marked contrast to the combination of the invention wherein the results obtained by the combination are far superior to that obtained using any of the salts of the novel combinations solely.

Thus, the invention provides a novel thickening agent combining a known thickening agent with a inoperative agent to yield a polyester having improved pot life by decelerating the initial thickening rate yet increasing the overall viscosity gain to provide a much higher viscosity after about 24 hours.

The invention enables one to chemically thicken a polyester resin to rapidly build up the viscosity in several days without significantly increasing the initial viscosity or shortening the pot life of the polyester resin as has been the case with the chemical thickeners used heretofore. Fibrous reinforcements can thus be pre-coated with a low viscosity polyester resin which will therefore properly wet the fibers, yet the polyester resin coating will rapidly lose its tacky state by the increase in viscosity enhancing the storability of the pre-coated fibers.

Thus, the use of preforms is eliminated as well as the attendant mess of coating the irregular-shaped preform with a liquid resin. Glass fiber mats coated with the resin of the invention may be easily handled and charged to molding machines. More positive control of the amount of charge as well as the shape of the charge can thus be maintained resulting in higher quality molded products.

What is claimed is:

1. An unsaturated polyester resin composition which greatly increases in viscosity a spaced period after formation of the composition which comprises:
    (a) an unsaturated polyester formed by condensing at least one dicarboxylic acid containing $\alpha,\beta$-ethylenic unsaturation with a dihydric alcohol;
    (b) an $\alpha,\beta$-ethylenically unsaturated copolymerizable monomer; and
    (c) a thickening agent in an amount sufficient to increase the viscosity of the composition after a spaced period of time consisting essentially of a mixture of calcium oxide and a second salt selected from the class consisting of magnesium oxide and calcium hydroxide.

2. The composition of claim 1 wherein said second salt is magnesium oxide.

3. The composition of claim 1 wherein said second salt is calcium hydroxide.

4. The composition of claim 2 wherein said thickening agent consists essentially of at least 1% by weight of the polyester resin composition of said calcium oxide and at least 1.5% by weight of the polyester resin composition of said magnesium oxide.

5. The composition of claim 3 wherein said thickening agent consists essentially of at least 1% by weight of the polyester composition of calcium oxide and at least 2% by weight of the polyester resin composition of calcium hydroxide.

6. In an unsaturated polyester resin composition which has incorporated therein a chemical thickening agent to provide a large increase in viscosity after formation of the composition which comprises:
    (a) an unsaturated polyester formed by condensing at least one dicarboxylic acid containing $\alpha,\beta$-ethylenic unsaturation with a dihydric alcohol;
    (b) an $\alpha,\beta$-ethylenically unsaturated copolymerizable monomer; and
    (c) a chemical thickening agent capable of increasing the viscosity of the composition selected from the class consisting of calcium hydroxide and magnesium oxide, the improvement which comprises:
    adding at least 1% by weight of the total polyester resin composition of calcium oxide to increase the pot life of the resin by slowing the initial viscosity increase and to raise the overall viscosity obtained after 24 hours.

References Cited

UNITED STATES PATENTS

| | | | |
|---|---|---|---|
| 2,568,331 | 9/1951 | Frilette | 260—865 |
| 3,219,604 | 11/1965 | Fischer | 260—865 |
| 3,373,129 | 3/1968 | Kori et al. | 260—40 |
| 3,390,205 | 6/1968 | Schnell et al. | 260—863 |
| 2,628,209 | 2/1953 | Fisk | 260—865 |

MURRAY TILLMAN, *Primary Examiner.*

J. T. GOOLKASIAN, *Assistant Examiner.*

U.S. Cl. X.R.

260—40